United States Patent
Suzuki et al.

(10) Patent No.: US 8,378,533 B2
(45) Date of Patent: Feb. 19, 2013

(54) PUMP MOTOR

(75) Inventors: Hideaki Suzuki, Kyoto (JP); Kyohei Asahi, Kyoto (JP)

(73) Assignee: Nidec Corporation, Kyoto (JP)

( * ) Notice: Subject to any disclaimer, the term of this patent is extended or adjusted under 35 U.S.C. 154(b) by 338 days.

(21) Appl. No.: 12/612,732

(22) Filed: Nov. 5, 2009

(65) Prior Publication Data

US 2010/0111731 A1 May 6, 2010

(30) Foreign Application Priority Data

Nov. 6, 2008 (JP) ................................. 2008-285070
Nov. 6, 2008 (JP) ................................. 2008-285643

(51) Int. Cl.
*H02K 1/16* (2006.01)
*H02K 5/00* (2006.01)
*F04D 13/06* (2006.01)

(52) U.S. Cl. ............ 310/43; 310/216.074; 310/216.091; 310/216.092; 310/216.105; 417/423.7

(58) Field of Classification Search ........... 310/216.074, 310/216.092–216.094, 156.53–156.58, 87, 310/43, 45, 216.105, 216.091; 417/357, 417/366, 367, 423.1, 423.7; 123/495, 497, 123/509
See application file for complete search history.

(56) References Cited

U.S. PATENT DOCUMENTS

| 4,048,530 | A | * | 9/1977 | Kaufman, Jr. | ................ | 310/89 |
|---|---|---|---|---|---|---|
| 4,384,226 | A | * | 5/1983 | Sato et al. | ................ | 310/89 |
| 4,998,865 | A | * | 3/1991 | Nakanishi et al. | ................ | 417/423.7 |
| 5,009,578 | A | * | 4/1991 | Hyland | ................ | 417/365 |
| 5,053,664 | A | * | 10/1991 | Kikuta et al. | ................ | 310/114 |
| 5,220,228 | A | * | 6/1993 | Sibata | ................ | 310/216.093 |
| 5,260,620 | A | * | 11/1993 | Morrill | ................ | 310/185 |
| 5,923,111 | A | * | 7/1999 | Eno et al. | ................ | 310/156.25 |
| 6,462,451 | B1 | * | 10/2002 | Kimura et al. | ................ | 310/156.38 |
| 6,759,776 | B2 | * | 7/2004 | Takahata et al. | ................ | 310/156.38 |
| 6,814,549 | B2 | * | 11/2004 | Kimberlin et al. | ................ | 417/357 |
| 6,909,216 | B2 | * | 6/2005 | Kadoya et al. | ................ | 310/180 |
| 7,382,076 | B2 | * | 6/2008 | Miyamori et al. | ................ | 310/216.091 |
| 7,550,891 | B2 | * | 6/2009 | Kim | ................ | 310/216.092 |
| 7,612,480 | B2 | * | 11/2009 | Fujii et al. | ................ | 310/156.53 |
| 7,679,252 | B2 | * | 3/2010 | Iwase et al. | ................ | 310/156.53 |
| 7,814,641 | B2 | * | 10/2010 | Du et al. | ................ | 29/557 |
| 7,839,036 | B2 | * | 11/2010 | Hansen et al. | ................ | 310/87 |
| 2007/0065315 | A1 | * | 3/2007 | Nagata et al. | ................ | 417/423.1 |
| 2009/0195113 | A1 | * | 8/2009 | Kolomeitsev et al. | . | 310/216.091 |

FOREIGN PATENT DOCUMENTS

| JP | 10-126981 A | 5/1998 |
|---|---|---|
| JP | 2003-259592 A | 9/2003 |

* cited by examiner

*Primary Examiner* — Tran Nguyen

(74) *Attorney, Agent, or Firm* — Keating & Bennett, LLP

(57) ABSTRACT

A pump motor includes a stator, a rotor and a housing accommodating the stator and the rotor. The stator has a plurality of teeth, each of the teeth being provided with a cap portion at its tip end. The rotor is arranged inside the stator in an opposing relationship with the cap portion of each of the teeth. The housing includes a fluid path defined therein. The fluid path includes a substantially annular gap axially extending between the stator and the rotor. The cap portion includes a first opposing surface and a second opposing surface provided in an opposing relationship with the rotor to define a portion of the fluid path, the distance between the first opposing surface and an outer circumferential surface of the rotor being greater than the distance between the second opposing surface and the outer circumferential surface of the rotor.

12 Claims, 4 Drawing Sheets

PUMP MOTOR

BACKGROUND OF THE INVENTION

1. Field of the Invention

The present invention relates to a motor. More specifically, the present invention relates to a motor that can be included in a pump for use in transferring fluids.

2. Description of the Related Art

A pump for transferring fluids is known in the art. A brushless motor is widely used as a drive source of this pump.

In general, a pump motor includes a motor casing having a fluid path therein through which a fluid is transferred. In the pump motor, however, it is sometimes the case that the restrictions in the layout of individual components such as a stator and a rotor make it difficult to secure a sufficient space required to define the fluid path. Taking this into account, it may be possible to use the gap between the stator and the rotor as the fluid path. This makes it possible to secure an axially-extending annular fluid path within the motor casing.

However, there is only a small gap left between the stator and the rotor to prevent the stator and the rotor from making contact with each other. Therefore, a flow resistance and a fluid pressure loss are high in such a fluid path, which may result in reduction in pump efficiency.

SUMMARY OF THE INVENTION

In order to overcome the problems described above, a pump motor in accordance with preferred embodiments of the present invention preferably includes a stator and a rotor. The stator has a plurality of teeth arranged in a circumferential direction, each of the teeth being provided with a cap portion at its tip end. The rotor is arranged inside the stator in an opposing relationship with the cap portion of each of the teeth. The pump motor further includes a housing arranged to accommodate the stator and the rotor. The housing preferably includes a fluid path defined therein, the fluid path being designed to transfer a fluid therethrough. The fluid path preferably includes a substantially annular gap axially extending between the stator and the rotor. The cap portion includes a first opposing surface and a second opposing surface provided in an opposing relationship with the rotor to define a portion of the fluid path, the distance between the first opposing surface and an outer circumferential surface of the rotor being greater than the distance between the second opposing surface and the outer circumferential surface of the rotor.

With a pump motor in accordance with a preferred embodiment of the present invention, it is possible to reduce the flow resistance in the fluid path and to reduce the fluid pressure loss.

Other features, elements, steps, characteristics and advantages of the present invention will become more apparent from the following detailed description of preferred embodiments of the present invention with reference to the attached drawings.

DETAILED DESCRIPTION OF THE PREFERRED EMBODIMENTS

Hereinafter, certain preferred embodiments of the present invention will be described with reference to the accompanying drawings. The preferred embodiments described below are only preferred examples and do not limit the scope of the present invention, or the elements, steps, features, characteristics, advantages, etc. of the present invention or the use of the present invention.

First Preferred Embodiment

Figure 1:
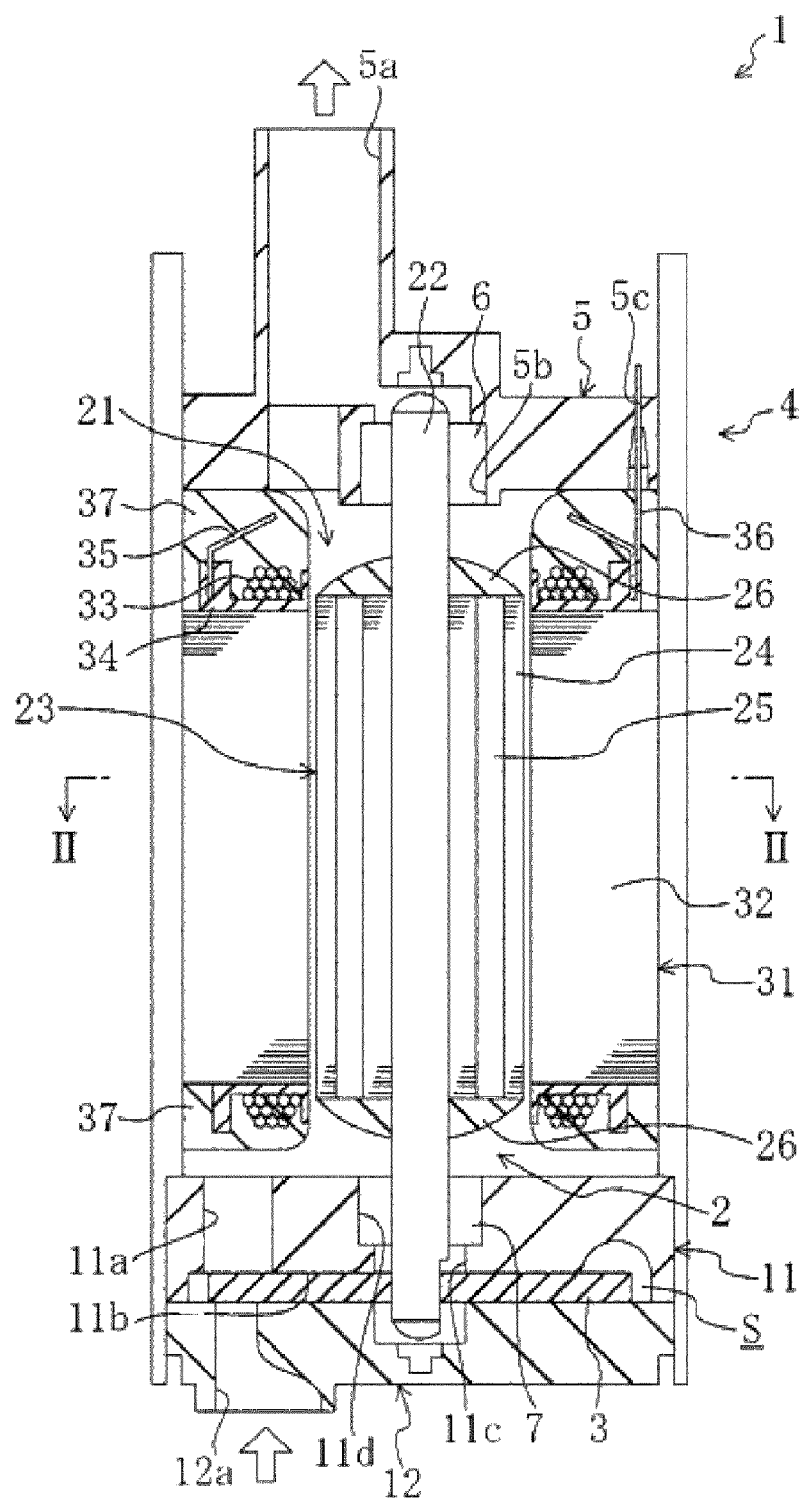
FIG. 1 is a section view schematically showing the overall configuration of a fuel pump including a pump motor according to a first preferred embodiment of the present invention.

FIG. 1 schematically shows the configuration of a fuel pump 1 including a motor 2 in accordance with a first preferred embodiment of the present invention. The fuel pump 1 is arranged within a fuel tank containing such fuel as gasoline, diesel fuel or the like in a state that it is submerged into the fuel. As an impeller 3 is rotated by the motor 2, the fuel pump 1 draws fuel into a substantially cylindrical metal housing 4 and then discharges the fuel out of the cylindrical metal housing 4. The fuel thus discharged is transferred to an engine through a fuel pipe. In other words, the motor 2 is a motor for a pump used in transferring a fluid such as fuel or the like.

More specifically, the housing 4 is arranged to accommodate the motor 2 and the impeller 3 therein. The impeller 3 is connected to the rotating shaft 22 of the motor 2. The motor 2 and the impeller 3 are serially arranged along the axial direction. The end portion of the housing 4 closer to the motor 2 is preferably covered by a discharge-side cover member 5, while the end portion of the housing 4 closer to the impeller 3 is preferably covered by a pump casing 11 and a pump cover 12. A pump chamber S is defined by the pump casing 11 and the pump cover 12 and the impeller 3 is contained within the pump chamber S.

The discharge-side cover member 5 is, e.g., a substantially disk-shaped resin member. The discharge-side cover member 5 includes an outlet port 5a extending in the thickness direction and a hollow portion 5b arranged to accommodate a bearing 6 therein. The bearing 6 rotatably supports one end portion of the rotating shaft 22 of the motor 2. In addition, a bus bar insertion hole 5c is arranged in the discharge-side cover member 5 so that an external bus bar 36 extending from the stator 31 of the motor 2 to the outside of the fuel pump 1 can be inserted into the bus bar insertion hole 5c.

The pump casing 11 and the pump cover 12 are preferably defined by, e.g., a substantially disk-shaped resin member. The pump casing 11 and the pump cover 12 are respectively arranged at inner and outer sides in the housing 4. The pump cover 12 includes an inlet port 12a extending in the thickness direction and communicating with the pump chamber S. The pump casing 11 includes an inlet passage 11a extending in the thickness direction and communicating with the pump chamber S. Thus, the interior of the housing 4 communicates with the outside through the inlet passage 11a, the pump chamber S and the inlet port 12a.

A recess portion 11b and a through-hole 11c are provided in the surface of the pump casing 11 closer to the pump cover 12. The recess portion 11b defines the pump chamber S. The rotating shaft 22 of the motor 2 is inserted through the through-hole 11c. An enlarged hole portion 11d arranged to receive a bearing 7 is provided in the surface of the pump casing 11 closer to the motor 2. The bearing 7 rotatably supports the other end portion of rotating shaft 22.

The impeller 3 preferably has, e.g., a propeller shape. The other end portion of the rotating shaft 22 is connected to substantially the central portion of the impeller 3 when seen in a plan view. The impeller 3 is shaped so that it can draw fuel into the housing 4 through the inlet port 12a when rotated. Therefore, as the impeller 3 rotates, the fuel is drawn into the pump chamber S through the inlet port 12a and then flows into the housing 4 of the fuel pump 1 through the inlet passage 11a. The fuel drawn into the housing 4 passes between the rotor 21 and the stator 31 of the motor 2 and is transferred to the outside through the outlet port 5a of the discharge-side cover member 5 (see white arrows in FIG. 1).

The motor 2 preferably includes a substantially cylindrical columnar rotor 21 and a substantially cylindrical stator 31 arranged to surround the rotor 21 so that the motor 2 has the configuration of a so-called brushless motor. More specifically, permanent magnets 25 are arranged within the rotor 21 and coils 33 are provided inside the stator 31. In the motor 2, the rotation of the rotor 21 is controlled by feeding an electric current to the coils 33 of the stator 31 at a specified timing.

Figure 2:
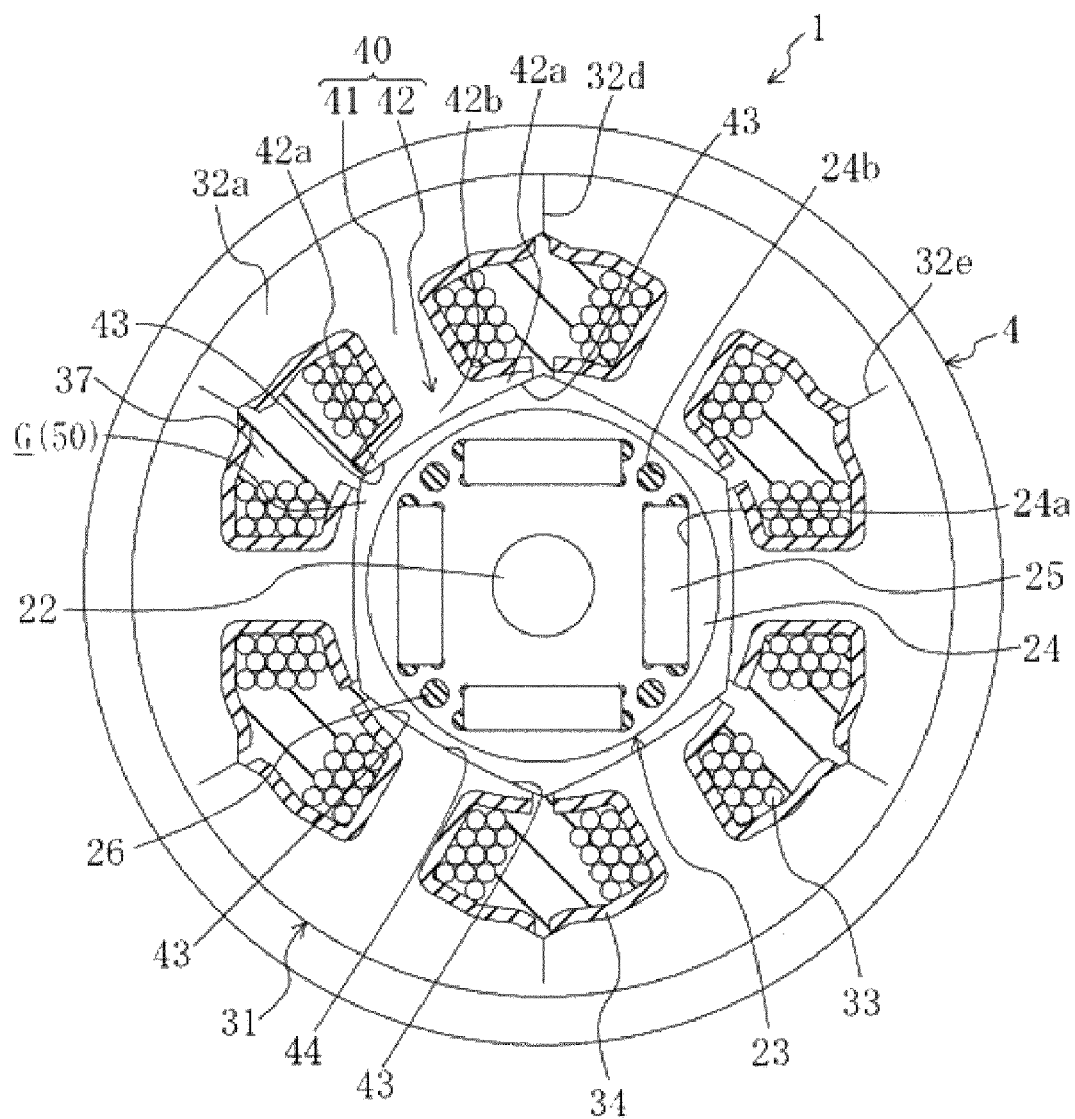
FIG. 2 is a view schematically showing the cross section taken along line II-II in FIG. 1.

The rotor 21 preferably includes the rotating shaft 22 and a rotor portion 23. The rotating shaft 22 is rotatably supported at its opposite ends by the bearings 6 and 7. The rotor portion 23 is fixed to the rotating shaft 22 to be rotated therewith. The rotor portion 23 preferably includes a substantially cylindrical rotor core 24 and a plurality of permanent magnets 25. The rotor core 24 is preferably defined by laminated steel plates, but any other desirable type of rotor core could be used. The permanent magnets 25 are preferably installed within the rotor core 24. As shown in FIG. 2, four, for example, slots 24a, each of which preferably has a substantially rectangular cross section, are preferably provided in the rotor portion 23 around the rotating shaft 22. The permanent magnets 25 are respectively inserted into the slots 24a.

As shown in FIG. 1, the axial opposite ends of the rotor portion 23 are covered with resin bodies 26 to keep the permanent magnets 25 from being removed from the rotor portion 23. This makes it possible to prevent the permanent magnets 25 from making contact with the fuel passing through the motor 2. This can also work to keep the permanent magnets 25 from gathering rust. Each of the resin bodies 26 is preferably arranged to have a substantially hemispherical shape with its thickness becoming gradually greater toward the rotational axis of the rotor portion 23. This makes it possible to reduce the flow resistance which would occur at the axial ends of the rotor portion 23 when fuel passes through the motor 2. This assures efficient flowing of the fuel.

The resin bodies 26 are made of a non-magnetic resin having a resistance to the fuel, such as PPS (polyphenylene sulfide), PPA (polyphthalamide), POM (polyacetal) or other suitable material. Therefore, even if the resin bodies 26 are exposed to the fuel, it does not adversely affect the performance of the motor 2.

As shown in FIG. 2, through-holes 24b serving as so-called flux barriers arranged to prevent magnetic flux from being shunted between the permanent magnets 25 are provided between the slots 24a of the rotor portion 23. The through-holes 24b are preferably arranged to axially extend through the rotor core 24. Therefore, when covering the axial opposite ends of the rotor portion 23 with the resin bodies 26, the through-holes 24b are also filled with resin bodies 26. As a result, the resin bodies 26 arranged at the axial opposite ends of the rotor portion 23 are interconnected by the resin bodies 26 filled in the through-holes 24b. This assists in increasing the bonding strength of the resin bodies 26 to the axial opposite ends of the rotor core 24.

The stator 31 preferably includes a stator core 32 and a plurality of coils 33. As shown in FIGS. 1 and 2, the stator core 32 is arranged into a substantially cylindrical shape by laminating steel plates one above another. The coils 33 are preferably formed by winding coil wires on the teeth 40 of the stator core 32. More specifically, the stator core 32 includes a substantially annular core-back portion 32a and a plurality of teeth 40. The teeth 40 are arranged at the inner peripheral side of the core-back portion 32a to be protruded radially inwards. In the present preferred embodiment, the stator core 32 preferably includes six teeth 40, for example.

The teeth 40 are circumferentially arranged at regular intervals around the outer periphery of the rotor 21. Each of the teeth 40 preferably includes a tooth base portion 41 and a tooth cap portion 42. The tooth base portion 41 has a substantially uniform transverse dimension and each of the coils 33 is formed around the tooth base portion 41. The tooth cap portion 42 is provided radially inwards of the tooth base portion 41.

The tooth cap portion 42 is configured to have a width greater than that of the tooth base portion 41. Each of the tooth cap portion 42 is opposed to the rotor portion 23 of the rotor 21. The tooth cap portion 42 preferably includes two protrusions 42a extending circumferentially from the tooth base portion 41 and a central portion 42b positioned between the protrusions 42a. As such, each of the teeth 40 preferably has a substantially T-shaped or Y-shaped cross section. The stator core 32 is a so-called straight core in which core portions each having a single tooth 40 are interconnected in a band shape. The stator core 32 is arranged into a substantially cylindrical shape by bending the straight core. In FIG. 2, reference character 32d designates the juncture of the straight core and reference character 32e designates the contact portions of the bent segments of the straight core.

Each of the teeth 40 is covered with an insulating member 34 ranging from the radial outer periphery of the tooth cap portion 42 to the radial inner periphery of the core-back portion 32a. Coil wires are wound on the insulating member 34. The respective coils 33 are connected to a copper bus bar 35 so that they can become U-, V- and W-phase coils when an electric current is supplied thereto. Through a copper external bus bar 36 connected to the bus bar 35, the respective coils 33 are electrically connected to a control circuit (not shown). The coil wires of the coils 33 spaced apart about 180 degrees from each other are interconnected to be the same phase when an electric current is supplied thereto.

As with the rotor 21, the axial opposite ends of the stator 31 are covered with resin bodies 37. In other words, the insulating member 34, the coils 33 and the bus bars 35 and 36 are sealed by the resin bodies 37 at the axial opposite ends of the stator 31 such that the resin bodies 37 cover all portions of the stator 31 within the pump motor that are arranged further in a radial direction from the rotor 21 than a distance from ends of the teeth 40 to the rotor 21. The resin bodies 37 are also filled in the axially-extending spaces defined between the adjacent teeth 40 such that the resin bodies 37 are arranged at portions that correspond to either a location of a greatest distance between the rotor 21 and the stator 31 (as shown, for example, in FIG. 2) or a location of a shortest distance between the rotor 21 and the stator 31 (as shown, for example, in FIGS. 3 and 4). By sealing the axial opposite ends of the stator 31 with the resin bodies 37 as stated above, it is possible to prevent metal portions, such as the copper bus bars 35 and 36, the coil wires, whose surface coatings are partially removed to permit a connection with the bus bars 35 and 36, and the steel plates of the stator core 32, from making contact with the fuel flowing through the motor 2. This makes it possible to prevent the metal portions from gathering rust, which would otherwise occur due to the fuel. Since the spaces between the adjacent teeth 40 are also sealed by the resin bodies 37, it is possible to keep the coil wires and the stator core 32 from making contact with the fuel.

A substantially annular gap G is defined between the teeth 40 of the stator 31 and the rotor 21. The presence of the gap G allows the rotor 21 to rotate without making contact with the stator 31. The gap G provides a fluid path 50 through which to transfer the fuel. The fluid path 50 has a substantially annular shape and extends in the axial direction. The fluid path 50 includes a lower end opening communicating with the inlet passage 11a and an upper end opening communicating with the outlet passage of the outlet port 5a. As the impeller 3 rotates, the fuel coming through the inlet passage 11a flows upwards through the fluid path 50 and then flows out through the outlet port 5a. Thereafter, the fuel is fed to an engine or the like.

The tooth cap portion 42 preferably includes first opposing surfaces 43 designed to increase the distance between the tooth cap portion 42 and the rotor 21 and to enlarge the flow path area of the fluid path 50. In the present preferred embodiment, the distance between the tooth cap portion 42 and the rotor 21 is not constant over the entire region of the fluid path 50. More specifically, the first opposing surfaces 43 and a second opposing surface 44 are provided on the surface of the tooth cap portion 42 opposed to the rotor 21. The distance between the first opposing surfaces 43 and the outer circumferential surface of the rotor 21 is greater than the distance between the second opposing surface 44 and the outer circumferential surface of the rotor 21. In other words, the first opposing surfaces 43 provide flow path expanding portions by which to enlarge the flow path area of the fluid path 50. This assists in reducing the flow resistance or the fuel-transferring pressure loss which may occur in the fluid path 50.

In the present preferred embodiment, the first opposing surfaces 43 are provided in the protrusions 42a of the tooth cap portion 42, while the second opposing surface 44 is provided in the central portion 42b of the tooth cap portion 42. In the tooth cap portion 42, therefore, the distance between the protrusions 42a and the rotor 21 is greater than the distance between the central portion 42b and the rotor 21. The first opposing surfaces 43 are arranged to ensure that the radius of curvature of the radial inner surface of the tooth cap portion 42 becomes greater than the radius of curvature of the outer circumferential surface of the rotor 21. The distance between the tooth cap portion 42 and the rotor 21 becomes greater from the central portion 42b toward the tip ends of the protrusions 42a. Although the surface of the tooth cap portion 42 opposed to the rotor 21 has a slight curvature in the present preferred embodiment, it may be a straight surface.

In the tooth cap portion 42, the central portion 42b makes a larger contribution to the generation of the torque for driving the rotor 21 than the protrusions 42a do. This is because, in the tooth cap portion 42, magnetic flux is more easily concentrated on the central portion 42b than on the protrusions 42a. In a hypothetical case where the first opposing surfaces 43 are defined in the central portion 42b of the tooth cap portion 42, the distance between the central portion 42b and the rotor 21 would become greater, which greatly reduces the quantity of the magnetic flux flowing toward the rotor 21 through the teeth 40. In the present preferred embodiment, the first opposing surfaces 43 are defined in the protrusions 42a on which the magnetic flux is hard to concentrate when compared with the central portion 42b. Thanks to this feature, the quantity of the magnetic flux flowing through the teeth 40 is not reduced so much, even if the distance between the protrusions 42a and the rotor 21 increases. This helps prevent reduction in motor efficiency which would otherwise be caused by the enlargement of the flow path area of the fluid path 50.

In the present preferred embodiment, the fluid path 50 is preferably provided between the stator 31 and the rotor 21. Because of this feature, the fluid path 50 can be secured with no restriction in the layout of individual components such as the stator 31 and the rotor 21. In the present preferred embodiment, the flow path area of the fluid path 50 is enlarged by providing the first opposing surfaces 43 in the tooth cap portion 42. This makes it possible to reduce the flow resistance in the fluid path 50 and eventually to reduce the fluid pressure loss. As a consequence, it becomes possible to prevent the fuel pump 1 from suffering from a reduction in pump efficiency.

In the present preferred embodiment, the first opposing surfaces 43 are defined in the protrusions 42a of the tooth cap portion 42. This makes it possible to reduce the flow resistance in the fluid path 50 without having to increase the distance between the central portion 42b of the tooth cap portion 42 and the rotor 21. By doing so, there occurs no sharp reduction in the quantity of the magnetic flux passing through the teeth 40, which makes it possible to prevent reduction in motor efficiency. In particular, the distance between the tooth cap portion 42 and the rotor 21 increases from the central portion 42b toward the tip ends of the protrusions 42a. This makes it possible to increase the flow path area of the fluid path 50 while minimizing reduction in the quantity of the magnetic flux passing through the teeth 40.

Second Preferred Embodiment

Figure 3:
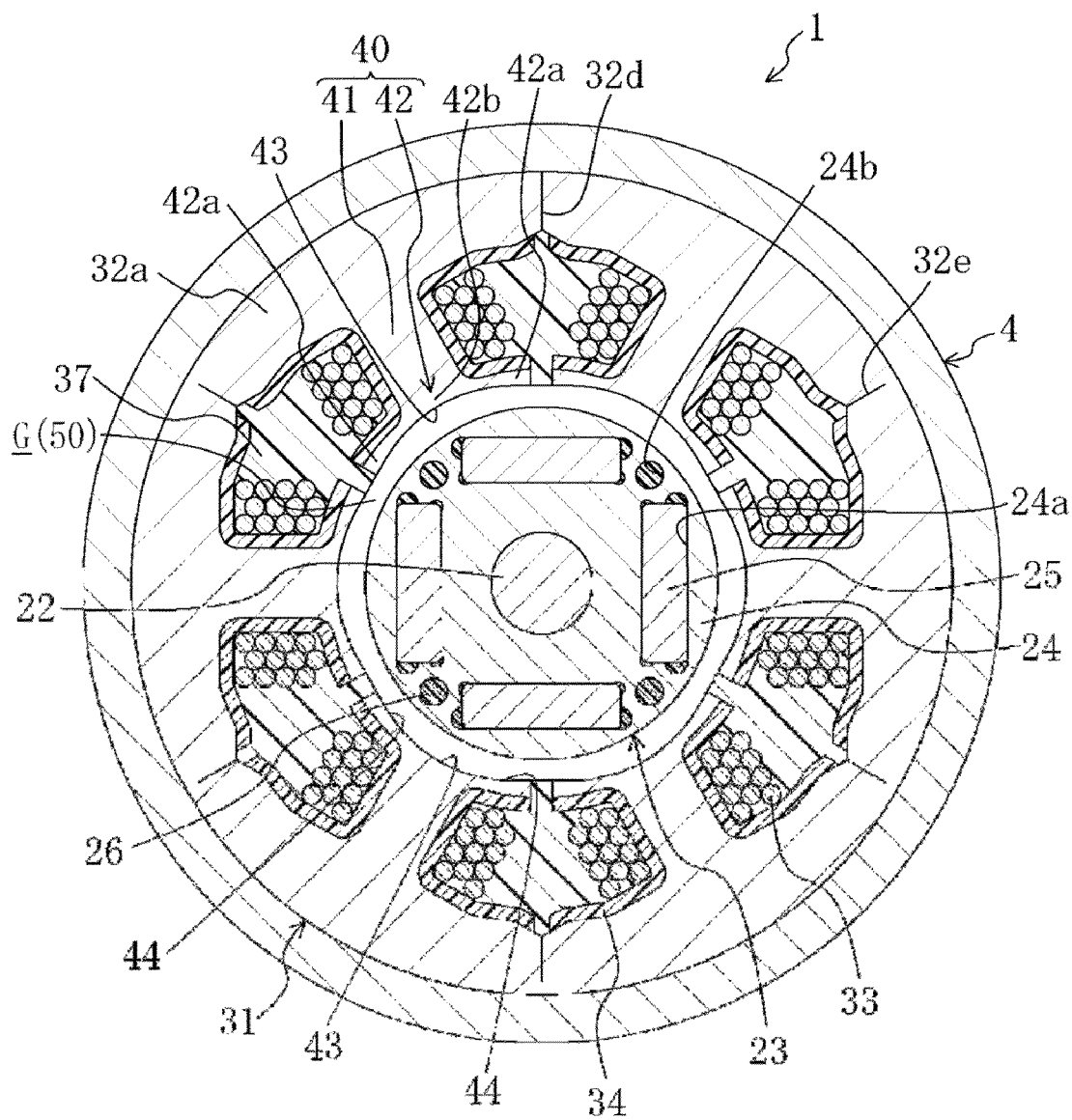
FIG. 3 is a view schematically showing the configuration of a pump motor according to a second preferred embodiment of the present invention.

FIG. 3 is a section view schematically showing the configuration of a motor in accordance with a second preferred embodiment of the present invention. In the first preferred embodiment described above, the first opposing surfaces 43 are provided in the protrusions 42a of the tooth cap portion 42 protruding circumferentially away from each other and the second opposing surface 44 is provided in the central portion 42b of the tooth cap portion 42. Alternatively, as shown in FIG. 3, a first opposing surface 43 may be provided in the central portion 42b of the tooth cap portion 42, with second opposing surfaces 44 provided in the protrusions 42a thereof. In the tooth cap portion 42 of the present preferred embodiment, the distance between the central portion 42b and the rotor 21 is greater than the distance between the protrusions 42a and the rotor 21. Since the flow path area is increased in this case, it is possible to reduce the flow resistance in the fluid path 50 and to prevent a reduction in pump efficiency.

Third Preferred Embodiment

Figure 4:
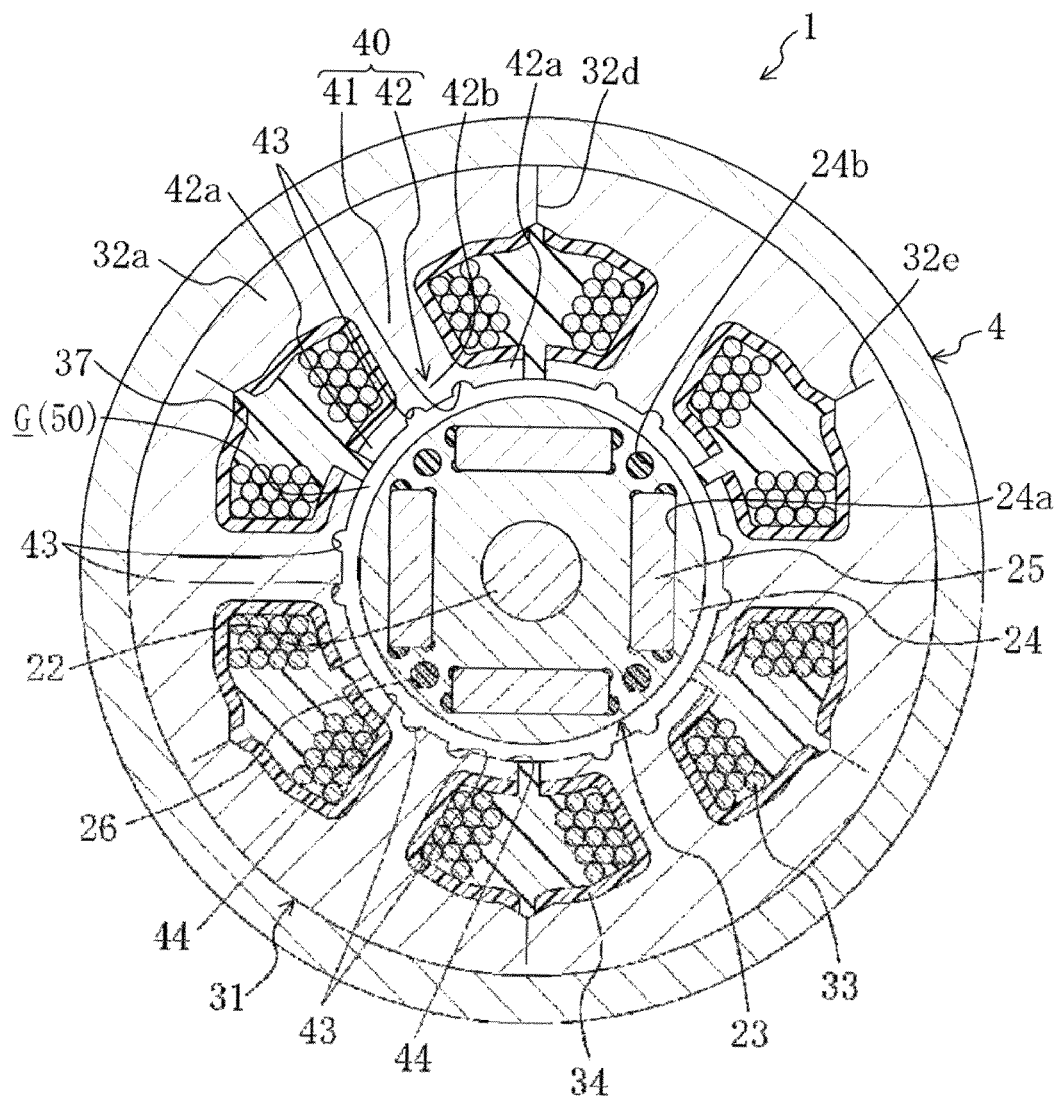
FIG. 4 is a view schematically showing the configuration of a pump motor according to a third preferred embodiment of the present invention.

FIG. 4 is a section view schematically showing the configuration of a motor in accordance with a third preferred embodiment of the present invention. In the third preferred embodiment, first opposing surfaces 43 may be provided by defining grooves in the tooth cap portion 42 as shown in FIG. 4. The grooves preferably have a substantially arc-shaped cross section and extend along the axial direction. The first opposing surfaces 43 refer to the surfaces of the grooves opposed to the outer circumferential surface of the rotor 21. The second opposing surface 44 refers to the surface of the tooth cap portion 42 other than the first opposing surfaces 43, which is also opposed to the rotor 21. In the present preferred embodiment, the fluid path 50 is arranged to have a substantially perfect circle shape, and the flow path area thereof is enlarged by the first opposing surfaces 43. As a result, it is possible in the present preferred embodiment to reduce the flow resistance in the fluid path 50 and to prevent reduction in pump efficiency. The grooves arranged to provide the first opposing surfaces 43 may have other shapes such as a substantially triangular shape, a substantially rectangular shape and a substantially trapezoidal shape, for example.

While certain preferred embodiments have been described hereinabove, the present invention is not limited to these preferred embodiments.

In the foregoing preferred embodiments, the resin bodies 26 preferably have a substantially hemispherical shape. However, the resin bodies 26 may have other shapes insofar as the thickness thereof becomes gradually greater toward the rotational axis of the rotor portion 23. For example, the resin bodies 26 may be a substantially conical shape.

In the foregoing preferred embodiments, the turbine-type pump with the impeller 3 is preferably used as a pump mechanism. However, the pump mechanism shall not be limited to the turbine-type pump. For example, it may be possible to use, as the pump mechanism, a positive displacement pump that includes a cylinder chamber of substantially cylindrical columnar shape and a roller arranged within the cylinder chamber so that it can make displacement to transfer fluids under pressure. The pump motors of the foregoing preferred embodiments may be applied not only to a fuel pump arranged to transfer fuel but also to, e.g., a water pump submerged into water to transferring the water.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. A pump motor comprising:
   a stator including a plurality of teeth arranged along a circumferential direction, each of the teeth provided with a cap portion at a tip end thereof, the stator being encapsulated with resin;
   a rotor arranged inside the stator and arranged to oppose the cap portion of each of the teeth;
   a housing arranged to accommodate the stator and the rotor, the housing including a fluid path defined therein, the fluid path being arranged to transfer a fluid therethrough; and
   an outlet port arranged axially above the fluid path and an inlet port arranged axially below the fluid path, at least a portion of the outlet port being arranged to overlap with the fluid path when viewed from the axial direction; and
   a discharge-side cover member including an outlet port, the discharge-side cover member includes an axially lower side surface that is in direct surface-to-surface contact with an axially upper side surface of the resin that encapsulates the stator; wherein
   the fluid path includes a substantially annular gap axially extending between the stator and the rotor;
   the cap portion of each of the teeth includes a first opposing surface and a second opposing surface provided in an opposing relationship with the rotor to define a portion of the fluid path, a distance between the first opposing surface and an outer circumferential surface of the rotor being greater than a distance between the second opposing surface and the outer circumferential surface of the rotor; and
   the discharge-side cover member is a separate member from the resin that encapsulates the stator.

2. The pump motor of claim 1, wherein the cap portion of each of the teeth includes protrusions extending circumferentially away from each other, the first opposing surface being provided in at least one of the protrusions.

3. The pump motor of claim 2, wherein the first opposing surface is provided in the cap portion so that a distance between the first opposing surface and the rotor increases from a central portion between the protrusions toward a tip end of each of the protrusions.

4. The pump motor of claim 1, wherein the first opposing surface includes a surface of a groove defined in the cap portion in an opposing relationship with the rotor.

5. The pump motor of claim 1, wherein the rotor includes a rotating shaft and a rotor portion, the rotor portion having axial opposite ends covered with resin bodies.

6. The pump motor of claim 5, wherein the rotor portion includes a flux barrier extending axially through the rotor portion, the flux barrier being filled with a resin to interconnect the resin bodies covering the axial opposite ends of the rotor portion.

7. The pump motor of claim 5, wherein the resin bodies have a substantially hemispherical or conical shape.

8. The pump motor of claim 1, wherein a radially innermost portion of the resin that encapsulates the stator is arranged in a gap between adjacent ones of the plurality of teeth such that the radially innermost portion of the resin is arranged at a distance that corresponds to a smallest distance between the rotor and the stator.

9. The pump motor of claim 1, wherein a radially inner portion of the resin that encapsulates the stator is arranged in a gap between adjacent ones of the plurality of teeth such that the radially inner portion of the resin is arranged at a distance that corresponds to a greatest distance between the rotor and the stator.

10. The pump motor of claim 1, wherein at least the second opposing surfaces of the cap portions of the teeth are not covered with the resin that encapsulates the stator.

11. The pump motor of claim 1, wherein the outlet port is arranged to overlap with both of the stator and the rotor when viewed from the axial direction.

12. A pump motor comprising:
    a stator including a plurality of teeth arranged along a circumferential direction, each of the teeth provided with a cap portion at a tip end thereof, the stator being encapsulated with resin;
    a rotor arranged inside the stator and arranged to oppose the cap portion of each of the teeth;
    a housing arranged to accommodate the stator and the rotor, the housing including a fluid path defined therein, the fluid path being arranged to transfer a fluid therethrough; and
    a discharge-side cover member including an outlet port, the discharge-side cover member includes an axially lower side surface that is flat and that is in direct surface-to-surface contact with an axially upper side surface of the resin that encapsulates the stator, the axially upper side surface of the resin being substantially flat; wherein
    the fluid path includes a substantially annular gap axially extending between the stator and the rotor; and the cap portion of each of the teeth includes a first opposing surface and a second opposing surface provided in an opposing relationship with the rotor to define a portion of the fluid path, a distance between the first opposing surface and an outer circumferential surface of the rotor being greater than a distance between the second opposing surface and the outer circumferential surface of the rotor.

* * * * *